Figure 1:
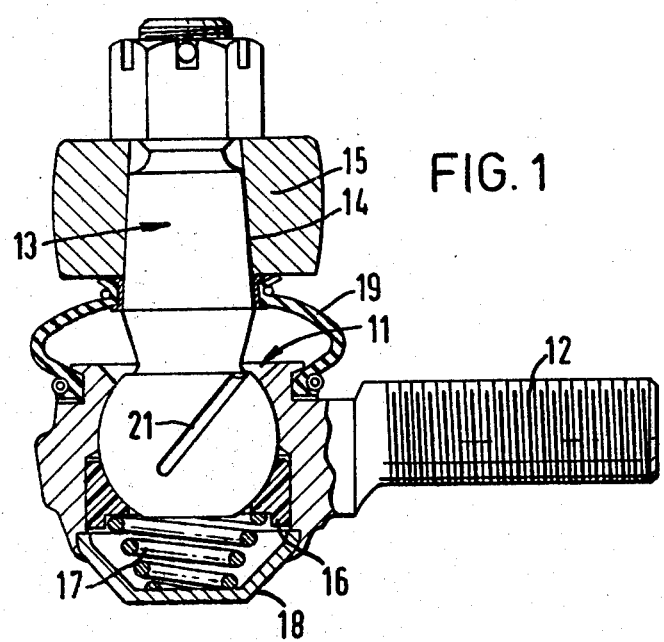

United States Patent [19]

Farrant

[11] 4,372,621
[45] Feb. 8, 1983

[54] BALL AND SOCKET JOINTS

[75] Inventor: David J. R. Farrant, Radford Semele, England

[73] Assignee: Automotive Products Limited, Warwickshire, England

[21] Appl. No.: 165,346

[22] Filed: Jul. 2, 1980

[30] Foreign Application Priority Data

Jun. 5, 1979 [GB] United Kingdom ................. 7923438

[51] Int. Cl.³ ............................................ F16C 11/06
[52] U.S. Cl. .................................. 308/2 R; 403/138; 384/125
[58] Field of Search ................... 308/2 R, 163, 26, 21; 403/133, 138, 140, 144

[56] References Cited

U.S. PATENT DOCUMENTS 3,781,073 12/1973 Jörn et al. ............................ 403/133
3,787,127 1/1974 Cutler ................................. 403/133

FOREIGN PATENT DOCUMENTS 917866 2/1963 United Kingdom .

Primary Examiner—Lenard A. Footland
Attorney, Agent, or Firm—Kemon & Estabrook

[57] ABSTRACT

A composite support bearing for the ball of a ball and socket joint comprises a hard plastics bearing member for the ball in the socket and a soft plastics cushion member held by the bearing member so as to be stressed by contact with the ball on assembly of the joint. The bearing member and the cushion member are preferably interlocked to prevent relative rotation.

4 Claims, 8 Drawing Figures

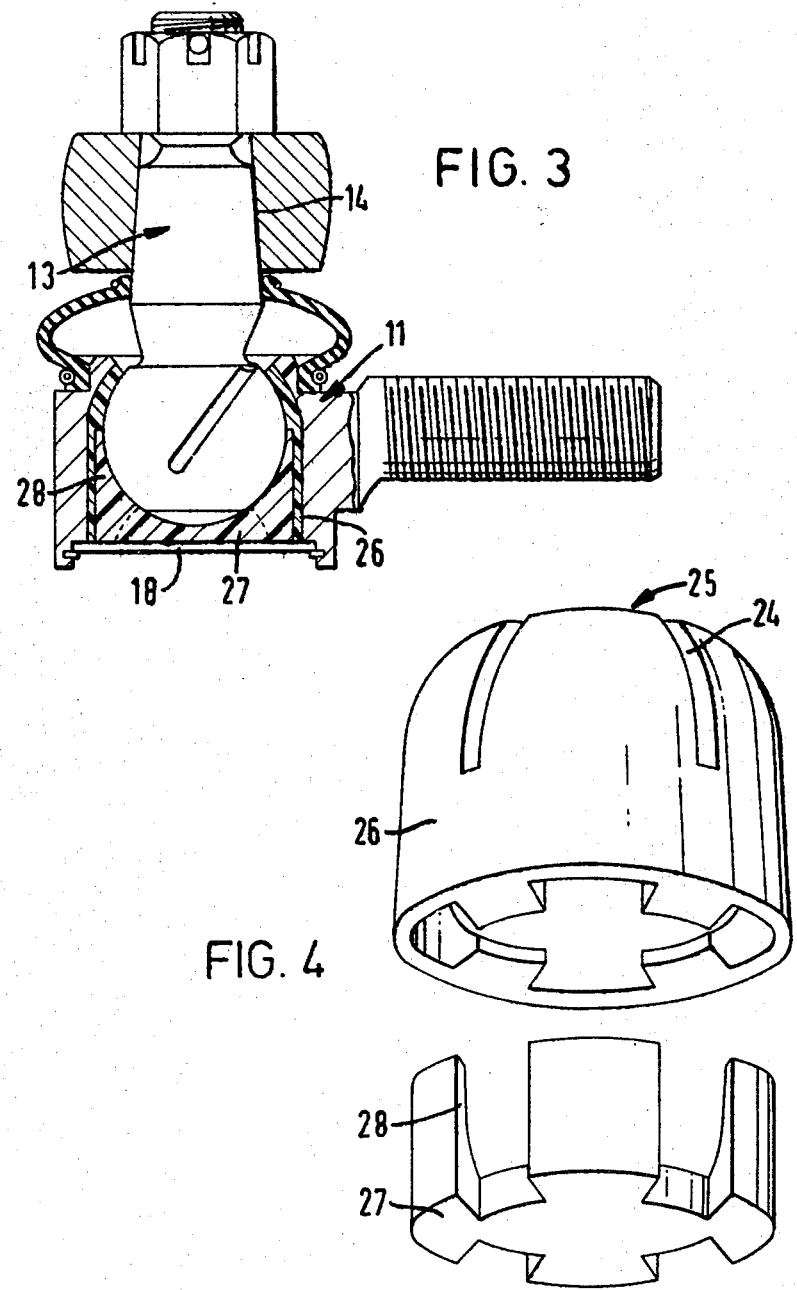

U.S. Patent  Feb. 8, 1983  Sheet 3 of 3  4,372,621

BALL AND SOCKET JOINTS

This invention relates to ball and socket joints suitable for motor vehicle steering and suspension systems.

Ball and socket joints for such systems normally include a compression spring to pre-load the ball in the socket after assembly of the joint. Such joints may also include a "hard" plastics bearing between the ball and socket; reference to "hard" plastics in this specification means, for example, plastics manufactured from polyamide or acetal resins.

One piece plastics bearings are known which are intended to both pre-load and support the ball pin, but any plastics material used for the bearing is necessarily a compromise since a relatively non-resilient plastics material is required for support and a relatively resilient material for pre-loading.

It is an object of the present invention to provide a plastics bearing for a ball and socket joint which overcomes the above disadvantage, which facilitates rapid joint assembly and which is of economical construction.

According to the invention there is provided a composite plastics support bearing for the ball of a ball and socket joint comprising a hard plastics bearing member for the ball in the socket and holding therewith a relatively short plastics cushion member held by the bearing member so as to be stressed by contact with the ball on assembly of the joint.

A suitable "soft" plastics material is for example, polyurethane rubber with an International Rubber Hardness Degree in the range 93–97.

Preferably the hard plastics member and soft plastics member are interlocked to prevent relative rotation.

According to one aspect of the invention the support bearing comprises only two components, a hard plastics bearing member and a soft plastics cushion member.

According to a further aspect of the invention the bearing member is a collar for the ball and the cushion member is a plug with radial arms which fits into and closes a corresponding radially notched end of the collar.

Figure 2:
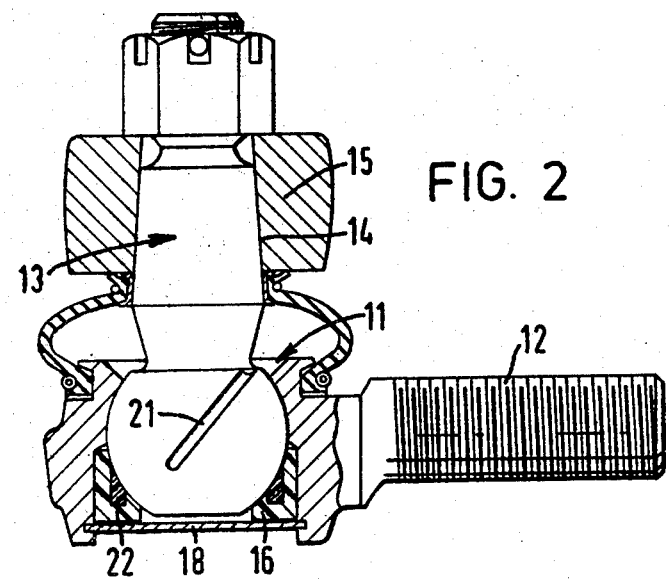
Figure 5:
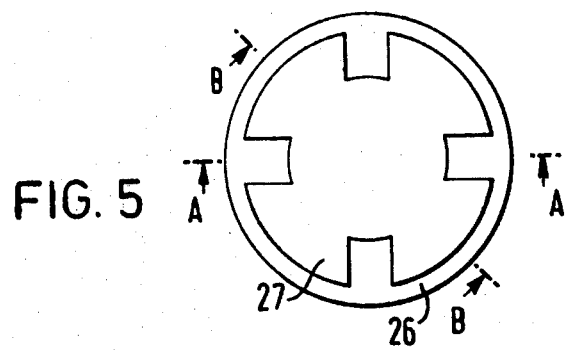
Figure 6:
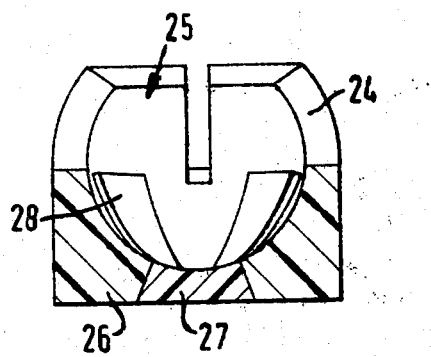
Figure 7:
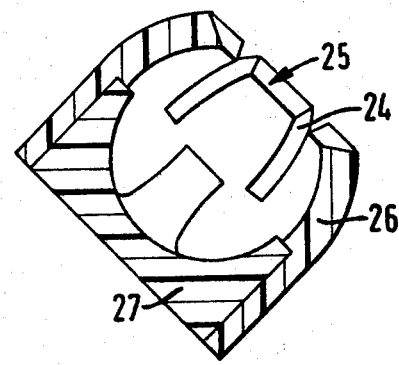
Figure 8:
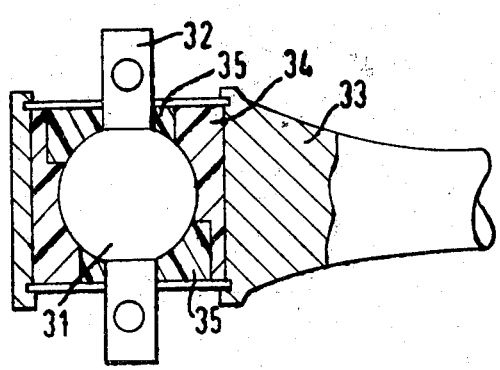

Other features of the invention are included in the following description of two embodiments shown, by way of example, in the accompanying drawings in which:

FIG. 1 shows a conventional ball and socket joint;
FIG. 2 shows the ball and socket joint of FIG. 1 incorporating the concept of the invention;
FIG. 3 shows the ball and socket joint of FIG. 1 incorporating one embodiment of the invention;
FIG. 4 is an exploded view of the plastics bearing for the joint depicted in FIG. 3;
FIG. 5 is a view of the underside of the assembled bearing of FIG. 4;
FIG. 6 is a sectional view through the assembled bearing of FIG. 5 on line A—A;
FIG. 7 is a sectional view through the assembled bearing of FIG. 5 on line B—B; and
FIG. 8 is a diametral section through a ball and socket joint incorporating a second embodiment of the invention.

With reference to FIG. 1 there is shown a conventional ball and socket joint for the steering system of a motor vehicle. The socket 11 has a threaded shank 12 for engagement with a steering tie rod (not shown) and the ball pin 13 has a plain tapered shank 14 threaded at its outermost end to receive and retain a steering arm 15, as shown.

The socket 11 provides a bearing surface for the upper half of the ball pin 13 as viewed, an annular hard plastics lower bearing 16 being biased against the head of the pin 13 by a coiled compression spring 17 acting against a closure member 18 of the socket 11. A flexible boot 19 both prevent the ingress of extraneous matter into the joint and the egress of lubricant, the usual groove 21 distributes lubricant in the joint.

FIG. 2 shows the joint depicted in FIG. 1 modified to incorporate the invention in conceptual form. The coiled spring 17 is replaced by a plastics insert 22 integral with the lower bearing 16 and arranged to stand proud of the bearing surface prior to joint assembly. The insert 22, which is of a relatively "soft" resilient plastics material such as polyurethane rubber with an international rubber hardness degree of 93–97 deforms an assembly of the joint to pre-load the ball pin. Such a construction facilitates rapid joint assembly and is extremely economical. Clearly the grades of hard and soft plastics material used can be chosen to suit the joint characteristics required.

One preferred embodiment of the invention is shown in FIGS. 3 to 7. A composite plastics bearing encompasses the ball pin head and is retained in the socket 11 by a closure member 18. Slits 24 formed in the wall of the bearing adjacent its mouth 25 enable the ball pin 13 to be snapped into place prior to assembly in the joint.

The bearing comprises interlocking hard and soft plastics members, as illustrated in FIG. 4. The hard plastics member 26 supports the ball pin head as a collar around the equator thereof and the "soft" plastics member 27 is inserted opposite the mouth 25 to contact the ball pin head such that on assembly of the joint, the member 27 is stressed to pre-load the ball pin 13.

In this preferred embodiment the soft plastics member 27 has four equispaced fingers 28 located in channels formed in the wall of the hard plastics member 26 to pre-load the head of the ball pin 13 over that half remote from the ball pin shank 14.

One advantageous feature of this interlocking construction is that the soft plastics member 27 does not reduce the positive location of the ball pin head afforded by the encapsulating hard plastics member 26.

A second preferred embodiment of the invention is shown in FIG. 8. A spherical bearing 31 having diametrally opposed arms 32 is supported in a housing 33 by a composite plastics bearing, such an arrangement is used, for example, in torque rod location of commercial vehicle rear axles.

The plastics bearing comprises an annular hard plastics member 34 into which the bearing 31 is snapped for retention in the housing 33. Annular soft plastics members 35 are inserted over the arms 32 to interlock with the hard plastics member and preload the bearing 31 in the manner previously described.

In the embodiment of FIG. 8 each soft plastics member 35 has three equispaced fingers 36 located in corresponding recesses in the hard plastics member 34.

Although the embodiments of FIGS. 2 and 3 show the grease groove 21 formed in the head of the ball pin 13 it may be desirable to alternatively form such a groove in the support bearing, dependent on the materials chosen for the bearing.

In an alternative embodiment, the interlocking hard and soft plastics members each have a single pair of diametrally opposed arms. Such an arrangement is particularly useful for a ball and socket joint working in a fixed plane where the hard plastics member supports the ball pin head in the working plane and the fingers of the soft plastics member are outside that plane. Many other designs of interlocking bearing for ball and socket joints are possible and the invention is not intended to be limited to those arrangements described herein.

I claim:

1. A composite plastics support bearing for the ball of a ball and socket joint comprising:
   a hard plastics bearing member for the ball in the socket; and
   a relatively soft plastics cushion member held by said bearing member so as to be stressed by contact with the ball on assembly of the joint, said bearing member and cushion member being interlocked by co-operating pre-formed profiles of the members to prevent relative rotation, the bearing member being a collar for the ball and the cushion member being a plug with radial arms which fits into and closes a correspondingly radially notched end of the collar.

2. A support bearing according to claim 1, wherein the bearing comprises two components only, a hard plastics bearing member and a soft plastics cushion member.

3. A support bearing according to claim 2, wherein the hard plastics bearing member is one of the polyamide resins and the soft plastics cushion member is a polyurethane rubber.

4. A support bearing according to claim 2, wherein the hard plastics bearing member is one of the acetal resins and the soft plastics cushion member is a polyurethane rubber.

* * * * *